US010412054B2

(12) United States Patent
Michiels et al.

(10) Patent No.: US 10,412,054 B2
(45) Date of Patent: Sep. 10, 2019

(54) METHOD FOR INTRODUCING DEPENDENCE OF WHITE-BOX IMPLEMENTATION ON A SET OF STRINGS

(71) Applicant: NXP B.V., Eindhoven (NL)

(72) Inventors: Wil Michiels, Reusel (NL); Jan Hoogerbrugge, Helmond (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/313,402

(22) Filed: Jun. 24, 2014

(65) Prior Publication Data

US 2015/0372989 A1    Dec. 24, 2015

(51) Int. Cl.
*H04L 29/06*   (2006.01)
*H04L 9/00*    (2006.01)
*H04L 9/06*    (2006.01)

(52) U.S. Cl.
CPC .......... *H04L 63/0428* (2013.01); *H04L 9/002* (2013.01); *H04L 9/0631* (2013.01); *H04L 63/083* (2013.01); *H04L 2209/043* (2013.01); *H04L 2209/16* (2013.01)

(58) Field of Classification Search
CPC . H04L 63/0428; H04L 63/062; G06F 21/125; G06F 21/14; H06F 21/64
USPC .................... 713/168, 190; 380/44
See application file for complete search history.

(56) References Cited

U.S. PATENT DOCUMENTS

| 8,479,016 | B2 | 7/2013 | Michiels et al. |
| 9,485,226 | B2 | 11/2016 | Michiels et al. |
| 2004/0139340 | A1 | 7/2004 | Johnson et al. |
| 2005/0138392 | A1 | 6/2005 | Johnson et al. |
| 2006/0140401 | A1* | 6/2006 | Johnson .................. G06F 21/14 380/44 |
| 2007/0014394 | A1 | 1/2007 | Harder |
| 2007/0086586 | A1 | 4/2007 | Jakubowski et al. |
| 2009/0228717 | A1* | 9/2009 | Futa ........................ G06F 21/14 713/190 |
| 2011/0067012 | A1 | 3/2011 | Eisen et al. |
| 2011/0116625 | A1 | 5/2011 | Michiels et al. |
| 2012/0002807 | A1 | 1/2012 | Michiels et al. |

(Continued)

FOREIGN PATENT DOCUMENTS

| CN | 101266571 A | 9/2008 |
| CN | 101491000 A | 7/2009 |
| FR | 2 922 393 | 10/2007 |

OTHER PUBLICATIONS

Chow, Stanley et al., "A White-Box DES Implementation for DRM Applications", Digital Rights Management: ACM CCS-9 Workshop, DRM 2002, Washington, D.C., USA, Nov. 18, 2002, 1-16.

(Continued)

*Primary Examiner* — Brandon S Hoffman
*Assistant Examiner* — Nega Woldemariam (57) ABSTRACT

A method of performing a cryptographic operation using a cryptographic implementation in a cryptographic system, including: receiving, by the cryptographic system, an identifying string value; receiving, by the cryptographic system, an input message; performing, by the cryptographic system, a keyed cryptographic operation mapping the input message into an output message wherein the output message is the correct result when the identifying string value is one of a set of binding string values, wherein the set includes a plurality of binding string values.

32 Claims, 4 Drawing Sheets

(56) References Cited

U.S. PATENT DOCUMENTS

| | | |
|---|---|---|
| 2012/0163582 A1 | 6/2012 | Lee et al. |
| 2014/0006803 A1 | 1/2014 | Bodis et al. |
| 2014/0101458 A1* | 4/2014 | Farrugia ............... G06F 21/125 |
| | | 713/190 |
| 2016/0012237 A1* | 1/2016 | Eftekhari ............... H04L 9/004 |
| | | 713/189 |

OTHER PUBLICATIONS

Chow, Stanley et al., "White-Box Cryptography and an AES Implementation", Cryptography: 9th Annual International Workshop, SAC 2002, St. John's, Newfoundland, Canada, Aug. 15, 2002.

Extended European Search Report for Patent Appln. No. 15172249.3 (dated Nov. 16, 2015).

Michiels; W.; "Opportunities in White-Box Cryptography"; IEEE Security & Privacy, 8(1), pp. 64-67 (2010).

"Syncrosoft MCFACT-Secure Data Processing Technology": Re-trust Sixth Quarterly Meeting, Mar. 11, 2008, Villach, Austria, 108 pages.

* cited by examiner

FIG. 1

WHITE-BOX IMPLEMENTATION

FUNCTIONS $f_i, g_i$ FIXED

METHOD FOR INTRODUCING DEPENDENCE OF WHITE-BOX IMPLEMENTATION ON A SET OF STRINGS

RELATED APPLICATION

This patent application is related to U.S. patent application Ser. No. 14/263,429, entitled "METHOD FOR INCLUDING AN IMPLICIT INTEGRITY OR AUTHENTICITY CHECK INTO A WHITE-BOX IMPLEMENTATION" to Michiels et al. (hereinafter "related application").

TECHNICAL FIELD

Various exemplary embodiments disclosed herein relate generally to a method for introducing dependence of a white-box implementation on a set of strings.

BACKGROUND

The Internet provides users with convenient and ubiquitous access to digital content. Because the Internet is a powerful distribution channel, many user devices strive to directly access the Internet. The user devices may include a personal computer, laptop computer, set-top box, internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

The widespread use of digital rights management (DRM) and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a non-transitory machine-readable storage medium encoded with instructions for execution by a cryptographic implementation in a cryptographic system for performing a cryptographic operation, the non-transitory machine-readable storage medium including: instructions for receiving, by the cryptographic system, an identifying string value; instructions for receiving, by the cryptographic system, an input message; instructions for performing, by the cryptographic system, a keyed cryptographic operation mapping the input message into an output message wherein the output message is the correct result when the identifying string value is one of a set of binding string values, wherein the set includes a plurality of binding string values.

Various embodiments are described wherein there are input messages for which the output message is an incorrect result when the identifying string is not in the set of binding string values.

Various embodiments are described wherein the identifying string value is based upon an identification of the cryptographic implementation.

Various embodiments are described wherein the identifying string value is based upon a hash of a portion of code in the cryptographic system.

Various embodiments are described wherein the identifying string value is based upon an identification of the cryptographic system.

Various embodiments are described wherein the identifying string value is based upon a user password.

Various embodiments are described wherein the cryptographic implementation includes a plurality of functions including a first function and second function, and the non-transitory machine-readable storage medium further includes: instructions for encoding an output of the first function based upon the identifying string value; and instructions for performing the second function on the encoded output of the first function wherein the second function includes decoding the encoded output of the first function using the set of binding string values.

Various embodiments are described wherein the cryptographic implementation includes a plurality of functions including a first function and second function, and the non-transitory machine-readable storage medium further includes: instructions for encoding an output of the first function using the set of binding string values; and instructions for performing the second function on the encoded output of the first function wherein the second function includes decoding the encoded output of the first function based upon the identifying string value.

Various embodiments are described wherein the cryptographic implementation includes a plurality of functions including a first function and second function, and the non-transitory machine-readable storage medium further includes: instructions for perturbing an output of the first function using the identifying string value; and instructions for performing the second function on the perturbed output of the first function wherein the second function includes compensating for the perturbation of the output of the first function using the set of binding string values.

Various embodiments are described wherein the cryptographic implementation includes a plurality of functions including a first function and second function, and the non-transitory machine-readable storage medium further includes: instructions for introducing a perturbation in the calculation of the first function based upon the identifying string value; instructions for compensating for the perturbation in the calculation of the first function during calculation of the second function based upon the set of binding string values.

Various embodiments are described wherein the cryptographic implementation includes a plurality of functions including a first function and second function, and the non-transitory machine-readable storage medium further includes: instructions for introducing a perturbation in the calculation of the first function based upon the set of binding string values; instructions for compensating for the perturbation in the calculation of the first function during calculation of the second function based upon the identifying string value.

Various embodiments are described wherein the cryptographic system includes a network of finite state machines.

Various embodiments are described wherein the cryptographic system includes a network of lookup tables.

Various embodiments are described wherein the cryptographic operation is one of advanced encryption system (AES) or data encryption standard (DES).

Various embodiments are described wherein the cryptographic implementation includes a plurality of functions including a first function and second function, and the non-transitory machine-readable storage medium further includes: instructions for modifying the first function based upon the identifying string value.

Various embodiments are described wherein the first function is a plurality of instructions, and modifying the first function based upon the identifying string value includes producing a modifying string value based upon the identifying string value and wherein a portion of the plurality of instructions is implemented using the modifying string value.

Further, various exemplary embodiments relate to a method of producing a cryptographic implementation of a cryptographic operation mapping an input message to an output message in a cryptographic system that binds the cryptographic implementation to a binding string value, including: receiving information specifying a set of binding string values; modifying a cryptographic implementation to receive an identifying string value; modifying the cryptographic implementation based upon the received information specifying the set of binding string values so that: when a received identifying string value is one of the set of binding string values, the cryptographic implementation outputs a correct output message.

Various embodiments are described wherein when a received identifying string value is not one of the set of binding string values, the cryptographic implementation outputs an incorrect output message.

Various embodiments are described wherein the identifying string value is based upon an identification of the cryptographic implementation.

Various embodiments are described wherein the identifying string value is based upon a hash of a portion of the cryptographic implementation.

Various embodiments are described wherein the identifying string value is based upon an identification of the cryptographic system.

Various embodiments are described wherein the identifying string value is based upon a user password.

Various embodiments are described wherein the cryptographic implementation includes a plurality of functions including a first function and second function, and modifying the cryptographic implementation so that: the output of one of the first function is encoded based upon the identifying string value; and a second function is performed on the encoded output of the first function wherein the second function includes decoding the encoded output of the first function using the set of binding string values.

Various embodiments are described wherein the cryptographic implementation includes a plurality of functions including a first function and second function, and modifying the cryptographic implementation so that: the output of one of the first function is encoded based upon the set of binding string values; and a second function is performed on the encoded output of the first function wherein the second function includes decoding the encoded output of the first function based upon the identifying string value.

Various embodiments are described wherein the cryptographic implementation includes a plurality of functions including a first function and second function, and modifying the cryptographic implementation so that: the output of one of the first function is perturbed using the identifying string value; and a second function is performed on the encoded output of the first function wherein the second function includes compensating for the perturbation of the output of the first function using the set of binding string values.

Various embodiments are described wherein the cryptographic implementation includes a plurality of functions including a first function and second function, and modifying the cryptographic implementation so that: a perturbation is introduced in the calculation of the first function based upon the identifying string value; and the perturbation in the calculation of the first function is compensated for during calculation of the second function based upon the set of binding string values.

Various embodiments are described wherein the cryptographic implementation includes a plurality of functions including a first function and second function, and modifying the cryptographic implementation so that: a perturbation is introduced in the calculation of the first function based upon the set of binding string values; the perturbation in the calculation of the first function is compensated for during calculation of the second function based upon the identifying string value.

Various embodiments are described wherein the cryptographic system includes a network of finite state machines.

Various embodiments are described wherein the cryptographic system includes a network of lookup tables.

Various embodiments are described wherein the cryptographic operation is one of advanced encryption system (AES) or data encryption standard (DES).

Various embodiments are described wherein the cryptographic implementation includes a plurality of functions including a first function, and modifying the cryptographic implementation so that: the first function is based upon the identifying string value.

Various embodiments are described wherein the first function is a plurality of instructions, and modifying the cryptographic implementation so that the first function is based upon the identifying string value includes producing a modifying string value based upon the identifying string value and wherein a portion of the plurality of instructions is implemented using the modifying string value.

Further, various exemplary embodiments relate to a method of performing a cryptographic operation using a cryptographic implementation in a cryptographic system, including: receiving, by the cryptographic system, an identifying string value; receiving, by the cryptographic system, an input message; performing, by the cryptographic system, a keyed cryptographic operation mapping the input message into an output message wherein the output message is the correct result when the identifying string value is one of a set of binding string values, wherein the set includes a plurality of binding string values.

Various embodiments are described wherein there are input messages for which the output message is an incorrect result when the identifying string is not in the set of binding string values.

Various embodiments are described wherein the identifying string value is based upon an identification of the cryptographic implementation.

Various embodiments are described wherein the identifying string value is based upon a hash of a portion of code in the cryptographic system.

Various embodiments are described wherein the identifying string value is based upon an identification of the cryptographic system.

Various embodiments are described wherein the identifying string value is based upon a user password.

Various embodiments are described wherein the cryptographic implementation includes a plurality of functions including a first function and second function, and the method further includes: encoding an output of the first function based upon the identifying string value; and performing the second function on the encoded output of the first function wherein the second function includes decoding the encoded output of the first function using the set of binding string values.

Various embodiments are described wherein the cryptographic implementation includes a plurality of functions including a first function and second function, and the method further includes: encoding an output of the first function using the set of binding string values; and performing the second function on the encoded output of the first function wherein the second function includes decoding the encoded output of the first function based upon the identifying string value.

Various embodiments are described wherein the cryptographic implementation includes a plurality of functions including a first function and a second function, and the method further includes: perturbing an output of the first function using the identifying string value; and performing the second function on the perturbed output of the first function wherein the second function includes compensating for the perturbation of the output of the first function using the set of binding string values.

Various embodiments are described wherein the cryptographic implementation includes a plurality of functions including a first function and second function, and the method further includes: introducing a perturbation in the calculation of the first function based upon the identifying string value; compensating for the perturbation in the calculation of the first function during calculation of the second function based upon the set of binding string values.

Various embodiments are described wherein the cryptographic implementation includes a plurality of functions including a first function and second function, and the method further includes: introducing a perturbation in the calculation of the first function based upon the set of binding string values; compensating for the perturbation in the calculation of the first function during calculation of the second function based upon the identifying string value.

Various embodiments are described wherein the cryptographic system includes a network of finite state machines.

Various embodiments are described wherein the cryptographic system includes a network of lookup tables.

Various embodiments are described wherein the cryptographic operation is one of advanced encryption system (AES) or data encryption standard (DES).

Various embodiments are described wherein the cryptographic implementation includes a plurality of functions including a first function, and the method further includes: modifying the first function based upon the identifying string value.

Various embodiments are described wherein the first function is a plurality of instructions, and modifying the first function based upon the identifying string value includes producing a modifying string value based upon the identifying string value and wherein a portion of the plurality of instructions is implemented using the modifying string value.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Code lifting is a problem that may arise with a software implementation of cryptographic algorithm. This problem may be overcome by binding the white-box implementation to an arbitrary given string s, i.e., the white-box implementation only works properly if the string s is available. Binding the white-box implementation to a string s, may be used to implement node locking, software tamper resistance, user binding, and traitor tracing. The problem of code lifting may arise because a software implementation of a cryptographic algorithm may be copied and used on unauthorized nodes or by unauthorized users. Accordingly, a white-box implementation, although it may effectively hide a cryptographic key, may still be distributed as a whole. This white-box implementation may be as valuable as the key itself. If, for instance, the white-box implementation implements a decryption algorithm, then by not having the key, the receiver may not be able to encrypt, but the white-box implementation is sufficient to decrypt. This means that an adversary illegitimately distributes the white-box implementation as a whole instead of the underlying hidden cryptographic key, which typically is of high value that should not be distributed in an uncontrolled way. Typically, the key is only present implicitly. In other embodiments, the key may include dynamic keys that, for example, take implicit key information and change it with some sort of dynamic information to change the key used in the cryptographic function.

As mentioned above the use of an arbitrary given string s may be used to overcome these problems. A solution for using an arbitrary given string s is described in U.S. Pat. No. 8,479,016 to Michiels ("Michiels"). The string s may be some binary string that may be derived from the device on which the white-box implementation should be running and that cannot be derived on other devices. For instance, s may be defined as a unique identifier of the device. In Michiels a white-box implementation is derived containing s, and this white-box implementation is placed on the device where the string s is omitted where the string is part of a lookup table or operational code used in the white-box implementation. As a result, the device can only execute the white-box implementation once it can derive the omitted string s and then uses the value of s when the table entry is requested that was omitted or to provide the correct instruction in the operational code, i.e., the white-box implementation can only be executed on the legitimate device.

In the related application, embodiments are described that implement an alternative approach for binding a white-box implementation to an arbitrary string s other than including it in the definition of a lookup table. Instead the string s is a parameter of a function of the white-box implementation, i.e., the string s is not used for the specification of the function (e.g., a lookup table or operational code) as in Michiels, but rather as a parameter of the function.

In the related application, a method for binding a white-box implementation to an arbitrary string s is described. This description is included below. Then the embodiments of Michiels and the related application will be extended to allow binding of the white-box implementation to a plurality of strings.

Any strings s that represent the integrity or authenticity of the system that the white-box implementation runs on may be used. If, for instance, s is the hash of some code fragment, then it hardens the software against tampering. Also, the string s may be used for node locking where s is the unique identification of a node or hardware in the white-box system. Another use-case for the string s is traitor tracing. If the string is the name of the legitimate owner of a white-box implementation, and if this white-box implementation is encountered on an illegitimate device or on the Internet, then the white-box implementation may be traced back to the source of the leakage. Further, s may be used to identify users by being associated with a user password or hash of a user password.

Both the related application and Michiels describe a method of making the correct functioning of a white-box implementation dependent on an arbitrary given string s. This may be used to solve the above problem of code lifting in the following way. Let the string s be some binary string that may be derived from the device on which the white-box implementation should be running and that cannot be derived on other devices. For instance, s may be defined as a unique identifier of the device. Next, the approach of the related application or Michiels is used to make the white-box implementation dependent on s. Then the obtained white-box implementation may be installed on a device, where string s is omitted. Then, the device may only execute the white-box implementation once the device can derive the omitted string s, i.e., the white-box implementation may only be executed on the legitimate device. Analogously, the white-box implementation may be bound to a person by letting the string s be a password or a (digitized) fingerprint.

A property of both approaches is that once the white-box implementation is derived, there is no longer a choice in the string s that needs to be provided to the implementation in order for it to work properly: that is, it works properly for all messages if and only if string s is present. This is, for instance, sufficient if a white-box implementation is to be bound to a single device. Suppose, however, that a user is to be provided with a white-box implementation that they can run on multiple devices: for instance, their mobile phone and their tablet. Then for both approaches the user must be provided with two white-box implementations: one for the mobile phone and one for the tablet. Another example where the option to choose between multiple strings in order to get a properly functioning white-box implementation is the following. Suppose that a white-box implementation is bound to a user via a string s representing a password. Then forgetting the password makes the white-box implementation useless. When the white-box implementation is used to decrypt valuable data, this then means that the valuable data cannot be read anymore. A solution may include (besides the password string s) that the white-box implementation also works properly for a password that is, for instance, only known by a helpdesk. In that case, the helpdesk may help to restore the valuable data. The embodiments of the invention described below make a white-box implementation dependent on a set of strings in the sense that the implementation works properly for any string in the set (instead of all strings in the set).

In order to demonstrate embodiments of the invention, an example white-box implementation of AES will now be described. White-box cryptography is the discipline of implementing a cryptographic algorithm in software such that it is difficult for an attacker to find the key. Hereby, the strongest conceivable (but for software most realistic) attack model is assumed in which the adversary is assumed to have full control over and full access to the white-box implementation.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, D R M 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The white-box implementation may be implemented using a plurality of basic blocks. The plurality of basic blocks is interconnected, in the sense that some of the blocks build on the outputs of one or more of the previous blocks.

A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number. Further, finite state machines or code obfuscation may be used to implement the white-box implementation.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round is includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function.

Figure 1:
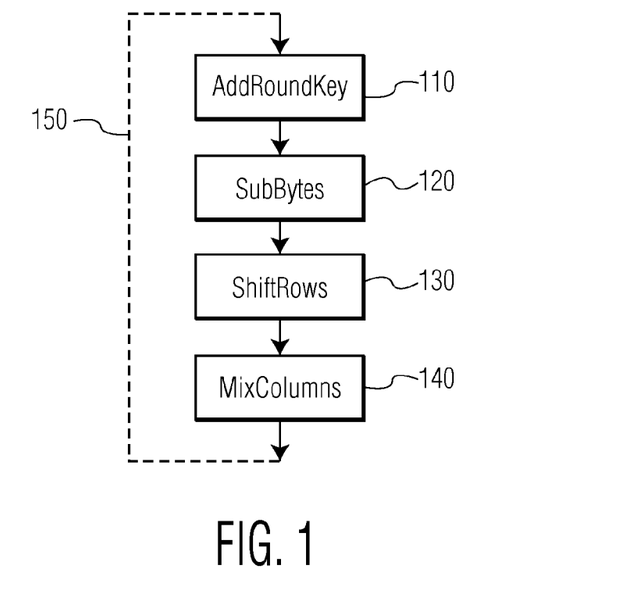
FIG. 1 illustrates the main steps of a round of AES.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in $GF(2^8)$.

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Figure 2:
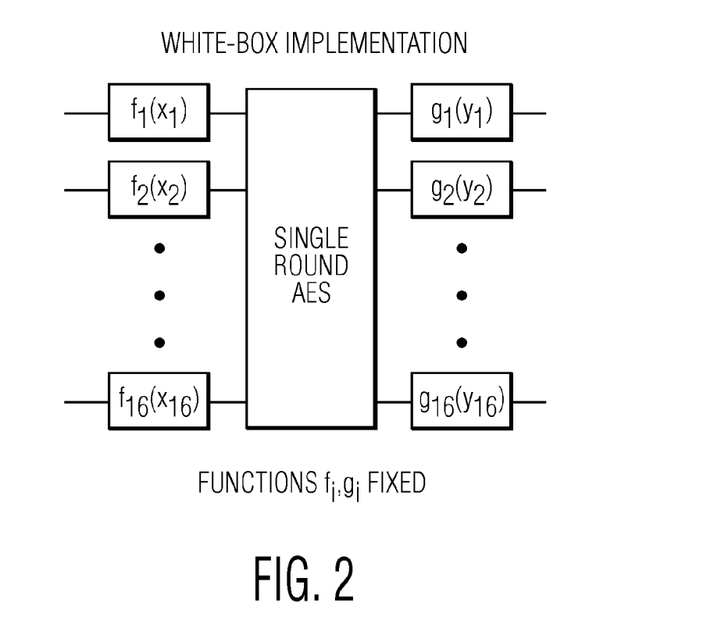
FIG. 2 illustrates a white-box AES implementation with encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Atis Straujums dated Mar. 11, 2008, which each are hereby incorporated by reference for all purposes as if fully set forth herein. FIG. 2 illustrates a white-box AES implementation with encodings on the input of the rounds, i.e., on the input of the S-boxes. As shown, each of the 16 input bytes are encoded by $f_i$ and each of the output bytes are encoded by $g_i$.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j}) = S(x_{i,j} \oplus k_{i,j})$ where $k_{i,j}$ is a single byte of a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing $T_{i,j}$ or implemented as a separate manipulation of the state matrix. In the MixColumns step, an output byte $z_{i,j}$ of the round is computed from the 4 output bytes $y_{1,j}, y_{2,j}, y_{3,j}$, and $y_{4,j}$ via the algebraic expression $z_{l,j} = MC_{l,1} \cdot y_{1,j} \oplus MC_{l,2} \cdot y_{2,j} \oplus MC_{l,3} \cdot y_{3,j} \oplus MC_{l,4} \cdot y_{4,j}$ in $GF(2^8)$ for some constants $MC_{l,r}$.

Now define a lookup table for each byte-to-byte function $Q_{i,j,l}(x_{i,j}) = MC_{l,i} \cdot T_{i,j}(x_{i,j})$ with i, j, l=1, 2, ..., 16. Then any output byte $z_{l,j}$ may be computed by XORing the results of these lookup tables, i.e., $z_{l,j} = Q_{1,j,l}(x_{1,j}) \oplus Q_{2,j,l}(x_{2,j}) \oplus Q_{3,j,l}(x_{3,j}) \oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{i,j}$ of an AES-round has been described as a network of lookup tables. The network of lookup tables to compute a single output nibble of byte $z_{2,3}$ is shown in FIG. 3.

Figure 3:
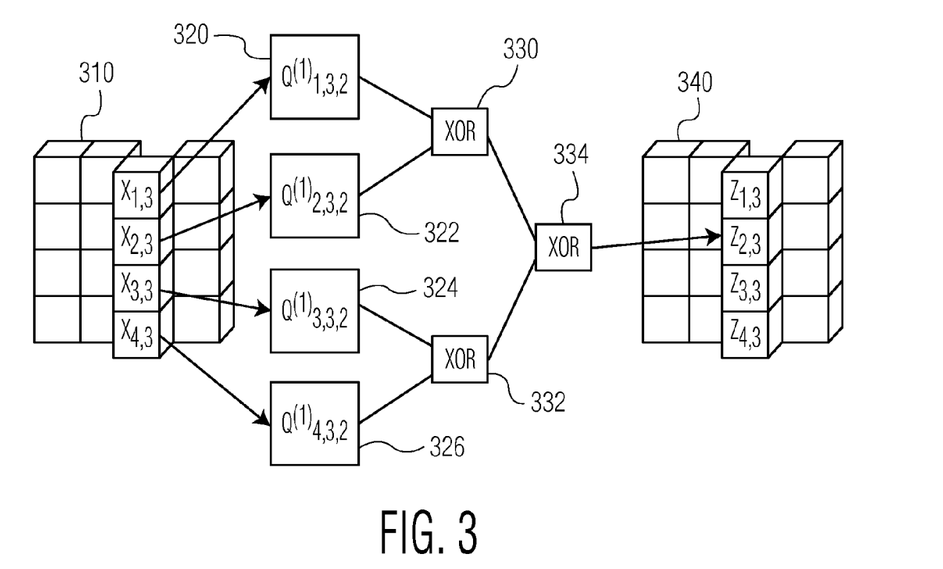
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}$, $x_{2,3}$, $x_{3,3}$, and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
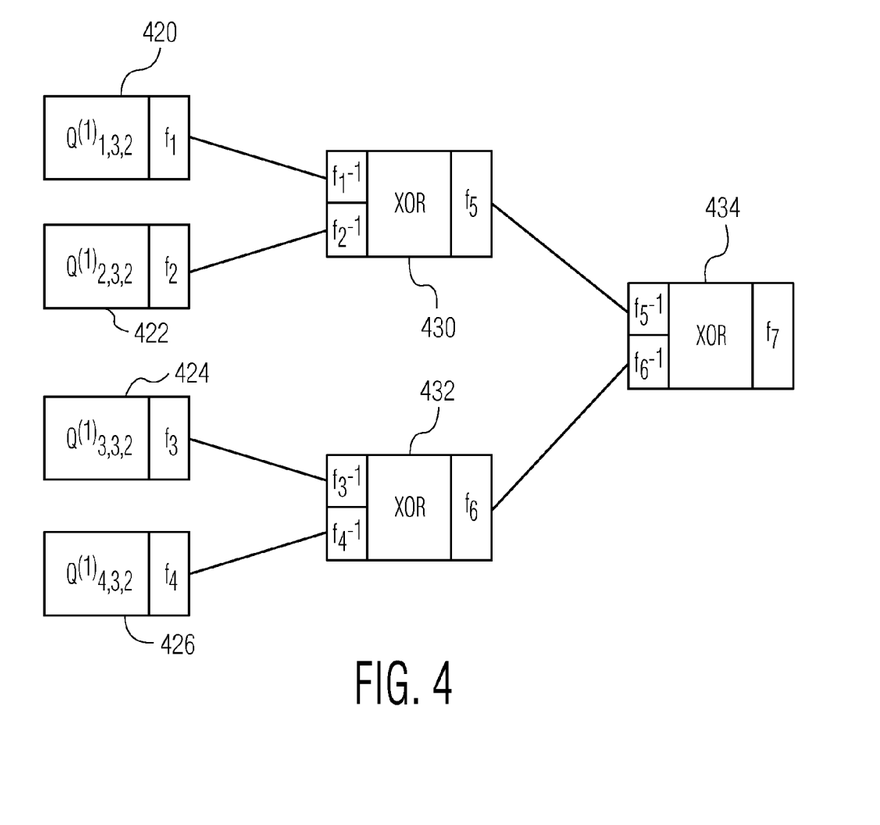
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

The description of the table lookup based white-box implementation described above was for the encryption operation of AES. It is noted that the above description is easily adapted for the decryption operation by using the inverse of the SubBytes, ShiftRows, and MixColumns operations (invSubytes, invShiftRows, and invMixColumns). Accordingly, it is assumed that the description above can be used for either the encryption or decryption operation of AES as needed in the embodiments below.

The related application describes the following embodiments. Let s be the parameter of a function (e.g., a lookup table) within the white-box implementation. That is, s is not used for the specification of the function, but as parameter of the function. In one embodiment, the internal encodings of intermediate values in the white-box implementation may be chosen in dependence of s. In another embodiment a dependence on s may be introduced in a computed value in the white-box implementation, which dependence is annihilated further on in the computation so that the correct computed result may be obtained.

The method of introducing the dependence on an arbitrary string s may work by parameterizing a white-box implementation with s. In a table-based white-box implementation, each lookup table has as input either the output (or part of the output) of another lookup table and/or the input (or part of the input) of the implementation (e.g., the plaintext to be encrypted). Accordingly, lookup tables or functions are introduced that have string s as their input.

As an example, a single string s including 4 bits may be bound to the white-box implementation. The string s may be called a binding string value. This embodiment may easily be extended to larger bit strings by applying the described method k times resulting in the binding of strings of 4k bits.

Figure 5:
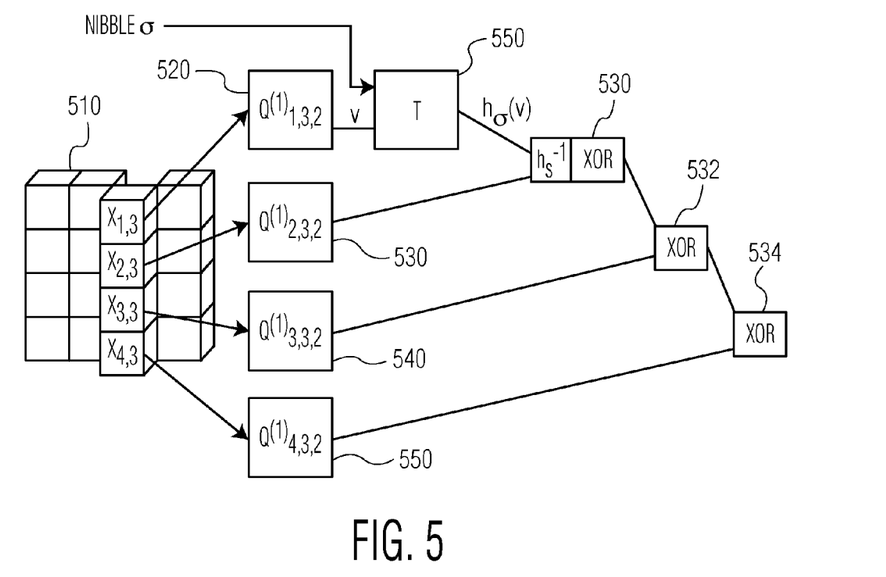
FIG. 5 illustrates a first embodiment of binding a white-box implementation.

FIG. 5 illustrates a first embodiment of binding a white-box implementation. FIG. 5 is similar to FIG. 3, but includes an extension to include binding the string s to the white-box implementation. A dependence on an arbitrary 4-bit string s may be implemented as follows. Let $h_0, \ldots, h_{15}$ be $2^4$ bijective encoding functions, and let T be a 8-to-4-bit lookup table 550 defined by $T(v,\sigma)=h_\sigma(v)$ where v is an output nibble from the Q-box 520 and the nibble σ is an identifying string value. As can be seen in FIG. 5, the lookup table T 550 receives the input v from Q-box 520 $Q^{(1)}_{1,3,2}$, and the output of T 550 is input into the succeeding XOR-table 530. The XOR-table 530 may compensate for effect of T 550 on v when σ=s. This may be accomplished by decoding the input to the XOR 530 using the function $h_s^{-1}$. When σ=s this results in the correct value of v being input to the XOR 530. Otherwise, the value input to the XOR 530 is incorrect and results in an incorrect output of the white-box implementation. It is noted that the earlier the lookup table T is implemented in the white-box implementation, the greater change it will have to the output when σ≠s.

Figure 6:
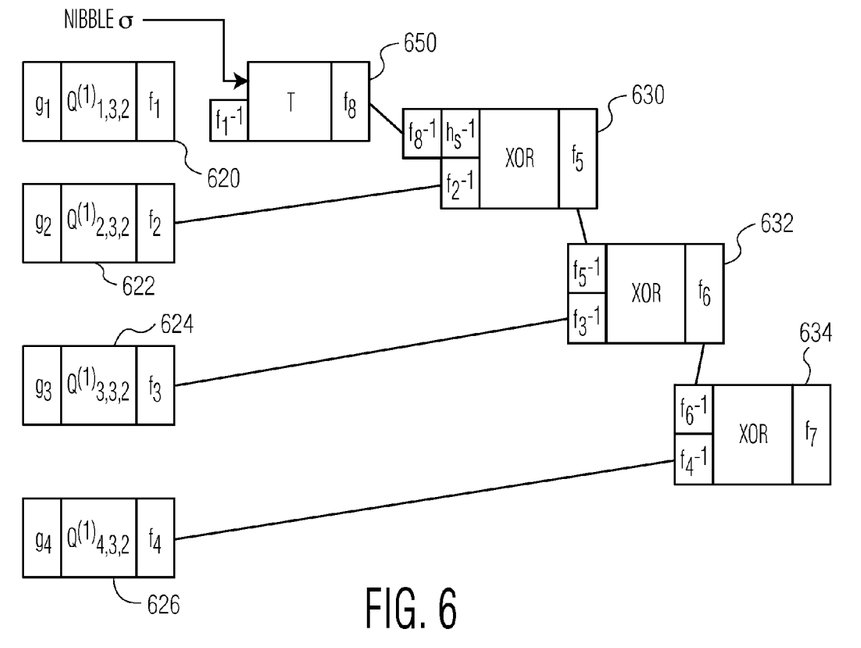
FIG. 6 illustrates the application of obfuscation to the white-box implementation of FIG. 5.

FIG. 6 illustrates the application of obfuscation to the white-box implementation of FIG. 5. Each of the Q-boxes 620, 622, 624, 626 correspond to the Q-boxes in FIG. 5 but include input decodings $g_i$ and output encodings $f_i$ as shown. Further, the lookup table 650 corresponds to the lookup table 550 in FIG. 5 but includes input decoding $f_1^{-1}$ and output encoding $f_g$. Finally, the lookup XOR-tables 630, 632, 634 correspond to the XOR-tables 530, 532, 534 in FIG. 5 but include input decodings $f_i^{-1}$ and output encodings $f_i$.

Now a description of extending the embodiment of FIG. 5 to include multiple binding strings will now be provided. Let $W \subseteq 2^4$ be set of 4-bit strings, and let s∈W. Then the embodiment of FIG. 5 may be extended so that if s∉W the white-box implementation produces an incorrect result. Define $h_0, \ldots, h_{15}$ such that if i∈W then $h_i(v)=h_s(v)$ for all nibbles v, and if i∉W then there exists at least one nibble v with $h_i(v) \neq h_s(v)$. This will result in the correct functioning of the white-box implementation dependent on the availability of any strings from a set IF.

This functionality may be implemented by modifying the white-box implementation described in FIG. 5 as follows. The table T 550 may be modified so that for any identifying string value σ that is in W, $h_\sigma$ is defined such that $h_\sigma(v)=h_s(v)$ for all nibbles v, On the other hand, if the identifying string value σ is not in W, there exists at least one nibble v with $h_i(v) \neq h_s(v)$. This will lead to the white-box implementation functioning incorrectly when the value of σ is not in W.

Figure 7:
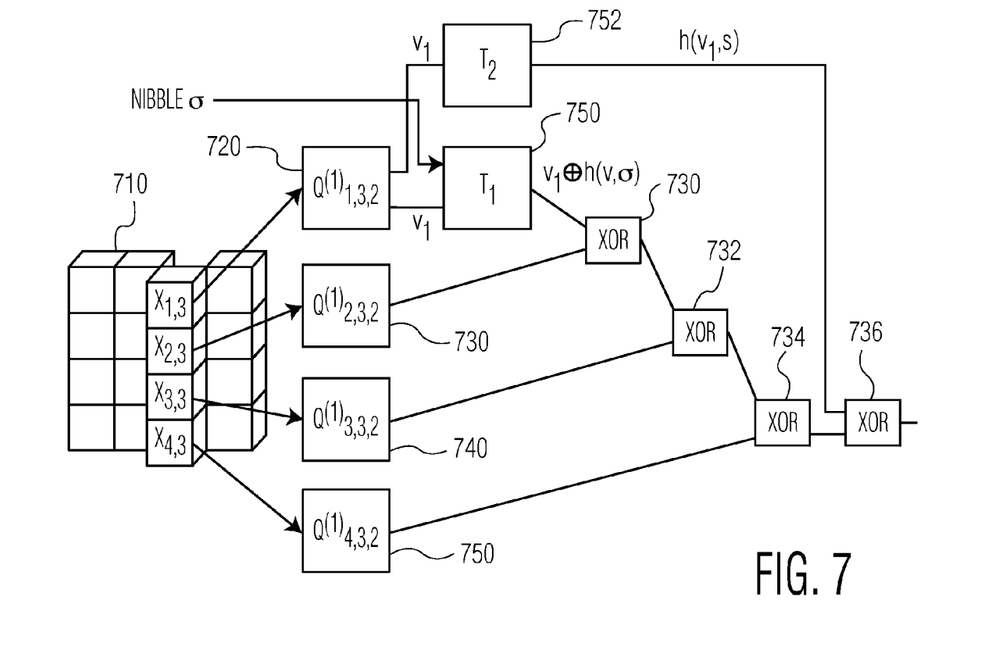
FIG. 7 illustrates a second embodiment of binding a white-box implementation.

FIG. 7 illustrates a second embodiment of binding a white-box implementation as described in the related application. In this embodiment, an output of a first function in the white-box implementation may be perturbed based upon σ or s. Then in an output of a second function, the perturbation may be compensated using s or σ respectively. Let $v_1$, $v_2$, $v_3$, $v_4$ be the 4 nibbles computed by the 4 Q-tables 720, 722, 724, 726. To the value $v_1$ computed after lookup table $Q^{(1)}_{1,3,2}$ 720 a value $h(\sigma,v_1)$ is added via a lookup table $T_1$ 750, where h is an arbitrary function with an 8-bit input and a 4-bit output. Hence, $T_1(\sigma,v_1)=v_1 \oplus h(\sigma,v_1)$. The idea is now how to compensate for the addition of $h(\sigma,v_1)$ when σ=s. This may be accomplished as follows. After adding $T_1$ 750, the network computes the value $v_1 \oplus v_2 \oplus v_3 \oplus v_4 \oplus h(\sigma,v_1)$ while $v_1 \oplus v_2 \oplus v_3 \oplus v_4$ should be computed. To compensate for this, a lookup table $T_2$ 752 and a XOR lookup table 736 may be added, where $T_2$ computes the value $h(s,v_1)$ and the XOR table adds $h(s,v_1)$ to $v_1 \oplus v_2 \oplus v_3 \oplus v_4 \oplus h(\sigma,v_1)$. This gives an implementation in which it is guaranteed that the proper value is calculated if and only if the implementation receives the parameter σ=s. Again, the lookup tables in FIG. 7 may be obfuscated as described above to obtain a final white-box implementation.

Now a description of extending the embodiment of FIG. 7 to include multiple binding strings will now be provided. Suppose that the white-box implementation is to work correctly for any string σ∈W with 1V containing multiple 4-bit strings. In the above embodiment h is defined as an arbitrary function from 8 to 4 bits. Now define h as an arbitrary function with the property that $h(v,\sigma)=h(v,s)$ for all σ∈W and $h(v,\sigma)\neq h(v,s)$ otherwise. This results in the property that the white-box implementation works properly for the entire message space if and only if σ∈W.

This functionality may be implemented by modifying the white-box implementation described in FIG. 7 as follows. The table $T_1$ 750 may be modified so that for any identifying string value σ that is in W, $h_\sigma$ is defined such that $h(v,\sigma)=h(v,s)$ for all nibbles v, On the other hand, if the identifying string value σ is not in W, then $h(v,\sigma)\neq h(v,s)$. This will lead to the white-box implementation functioning incorrectly when the value of σ is not in V.

Michiels describes a method of using a binding string s to specify a portion of a look up table or software codes used in the white-box implementation. Accordingly, the white-box implementation only works correctly when a string σ equal to the binding string s is present. Then the lookup table or software code will function properly. Otherwise improper output values may be obtained when the string σ does not equal the binding string s.

Now to extend the embodiment of Michiels to accommodate a plurality of binding strings s, let $W \subseteq 2^4$ be set of strings, and let s∈W. Then the computation of the white-box implementation is disturbed if s∉W. One may use techniques similar to those described above to achieve a similar result using the embodiment of Michiels.

A method according to the embodiments of the invention may be implemented on a computer as a computer implemented method. Executable code for a method according to the invention may be stored on a computer program medium. Examples of computer program media include memory devices, optical storage devices, integrated circuits, servers, online software, etc. Accordingly, a white-box system may include a computer implementing a white-box computer program. Such system, may also include other hardware elements including storage, network interface for transmission of data with external systems as well as among elements of the white-box system.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Figure 8:
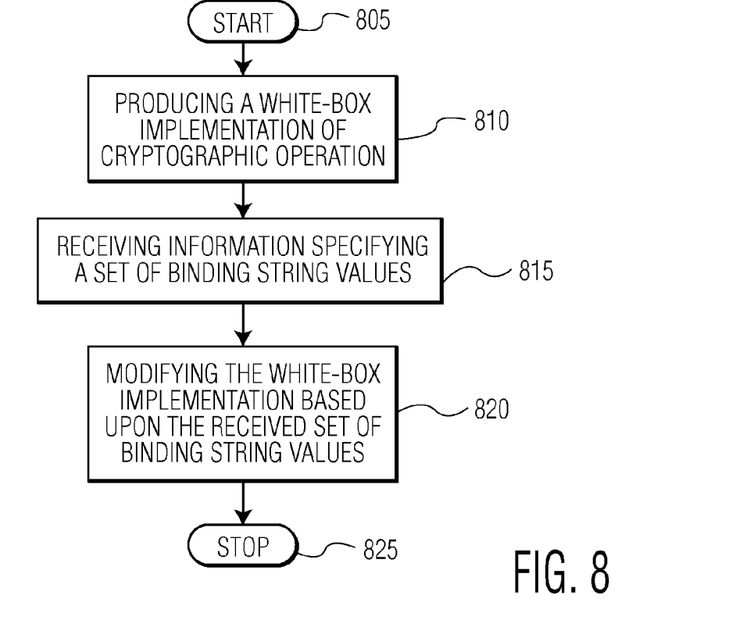
FIG. 8 is a flow chart illustrating a method of binding a white-box implementation to a set of binding strings.

FIG. 8 is a flow chart illustrating a method of binding a white-box implementation to a binding string. First, the method begins at 805. Then, a white-box implementation of the cryptographic operation is produced or received 810. This may be produced as described above using various methods and implementations. Next, information identifying a set of strings such that s∈W may be received 815. The strings s may provide binding to a set of specific software instances or a specific hardware systems. Then, the white-box implementation may be modified based upon the set of strings s 820 so that: when an input σ is received that is one of the set of binding string values, the white-box implementation produces correct output for the cryptographic operation implemented by the white-box implementation; and when an input u is received that is not one of the set of binding string values, the white-box implementation produces an incorrect output for the cryptographic operation implemented by the white-box implementation. The various embodiments discussed above provide different ways in which this capability may be implemented in the white-box implementation. The method may then end 825.

The cryptographic system described herein may be implemented on a user device such as a mobile phone, table, computer, set top box, smart TV, etc. A content provider, such as a television network, video stream service, financial institution, music streaming service, etc., may provide software to the user device for receiving encrypted content from the content provider. That software may have the encryption key embedded therein as described above, and may also include binding strings as described above. Then the content provider may send encrypted content to the user device, which may then decrypt using the supplied software and use the content.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a white-box implementation of a cryptographic function having a plurality of layers with a state matrix configured to indicate the state of the cryptographic operation between layers, wherein the cryptographic function maps an input message into an output message comprising instructions for implementing:
- a first substitution box in a first layer configured to receive a first portion of the state matrix and produce a first output;
- a second substitution box in a first layer configured to receive a second portion of the state matrix and produce a second output;
- a lookup table configured to receive the first output and an identifying string value to produce an encoded first output, wherein the encoding of the first output is selected based upon the identifying string;
- an XOR configured to decode the encoded first output based on a set of binding string values and to combine the decoded first output and the second output,
- wherein the decoded first output is equal to the first output when the identifying string value is equal to one of a set of binding string values resulting in the output message having a correct value, and
- wherein the decoded first output is not equal to the first output when the identifying string value is not equal to one of a set of binding string values resulting in the output message having an incorrect value.

2. The non-transitory machine-readable storage medium encoded with instructions for execution by a white-box implementation of a cryptographic function of claim 1, wherein the identifying string value is based upon an identification of the white-box implementation of a cryptographic function.

3. The non-transitory machine-readable storage medium encoded with instructions for execution by a white-box implementation of a cryptographic function of claim 1, wherein the identifying string value is based upon a hash of a portion of code in the white-box implementation of a cryptographic function.

4. The non-transitory machine-readable storage medium encoded with instructions for execution by a white-box implementation of a cryptographic function of claim 1, wherein the identifying string value is based upon an identification of a cryptographic system implementing the white-box implementation of the cryptographic function.

5. The non-transitory machine-readable storage medium encoded with instructions for execution by a white-box implementation of a cryptographic function of claim 1, wherein the identifying string value is based upon a user password.

6. The non-transitory machine-readable storage medium encoded with instructions for execution by a white-box implementation of a cryptographic function of claim 1, wherein the white-box implementation of the cryptographic function includes a network of finite state machines.

7. The non-transitory machine-readable storage medium encoded with instructions for execution by a white-box implementation of a cryptographic function of claim 1, wherein the white-box implementation of the cryptographic function includes a network of lookup tables.

8. The non-transitory machine-readable storage medium encoded with instructions for execution by a white-box implementation of a cryptographic function of claim 1, wherein the cryptographic function is one of advanced encryption system (AES) or data encryption standard (DES).

9. A non-transitory machine-readable storage medium encoded with instructions for execution by a white-box implementation of a cryptographic function having a plurality of layers with a state matrix configured to indicate the state of the cryptographic operation between layers, wherein the cryptographic function maps an input message into an output message comprising instructions for implementing:
- a first substitution box in a first layer configured to receive a first portion of the state matrix and produce a first output $v_1$;
- a second substitution box in a first layer configured to receive a second portion of the state matrix and produce a second output $v_2$;
- a first lookup table configured to receive the first output $v_1$ and an identifying string value $\sigma$ to calculate $v_1 \oplus h(\sigma, v_1)$, wherein h is an arbitrary function;
- a second lookup table configured to receive the first output $v_1$ to calculate $h(s, v_1)$ where s is a set of binding string values;
- a first XOR configured to calculate $v_1 \oplus h(\sigma, v_1) \oplus v_2$; and
- a second XOR configured to combine $v_1 \oplus h(\sigma, v_1) \oplus v_2$ with $h(s, v_1)$,
- wherein the output of the second XOR is based on $v_1 \oplus v_2$ when the identifying string value $\sigma$ is equal to one of a set of binding string values s resulting in the output message having a correct value, and
- wherein the output of the second XOR is not based on $v_1 \oplus v_2$ when the identifying string value $\sigma$ is not equal to one of a set of binding string values s resulting in the output message having an incorrect value.

10. The non-transitory machine-readable storage medium encoded with instructions for execution by a white-box implementation of a cryptographic function of claim 9, wherein the identifying string value is based upon an identification of the white-box implementation of a cryptographic function.

11. The non-transitory machine-readable storage medium encoded with instructions for execution by a white-box implementation of a cryptographic function of claim 9, wherein the identifying string value is based upon a hash of a portion of code in the white-box implementation of a cryptographic function.

12. The non-transitory machine-readable storage medium encoded with instructions for execution by a white-box implementation of a cryptographic function of claim 9, wherein the identifying string value is based upon an identification of a cryptographic system implementing the white-box implementation of the cryptographic function.

13. The non-transitory machine-readable storage medium encoded with instructions for execution by a white-box implementation of a cryptographic function of claim 9, wherein the identifying string value is based upon a user password.

14. The non-transitory machine-readable storage medium encoded with instructions for execution by a white-box implementation of a cryptographic function of claim 9, wherein the white-box implementation of the cryptographic function includes a network of finite state machines.

15. The non-transitory machine-readable storage medium encoded with instructions for execution by a white-box implementation of a cryptographic function of claim 9, wherein the white-box implementation of the cryptographic function includes a network of lookup tables.

16. The non-transitory machine-readable storage medium encoded with instructions for execution by a white-box implementation of a cryptographic function of claim 9, wherein the cryptographic function is one of advanced encryption system (AES) or data encryption standard (DES).

17. A method of mapping an input message into an output message using a white-box implementation of a cryptographic function having a plurality of layers with a state matrix configured to indicate the state of the cryptographic operation between layers, comprising:
 receiving a first portion of the state matrix by a first substitution box in a first layer and producing a first output;
 receiving a second portion of the state matrix by a second substitution box in a first layer and producing a second output;
 producing an encoded first output by a first a lookup table configured to receive the first output and an identifying string value, wherein the encoding of the first output is selected based upon the identifying string;
 decoding the encoded first output, by an XOR, based on a set of binding string values and combining the decoded first output and the second output,
 wherein the decoded first output is equal to the first output when the identifying string value is equal to one of a set of binding string values resulting in the output message having a correct value, and
 wherein the decoded first output is not equal to the first output when the identifying string value is not equal to one of a set of binding string values resulting in the output message having an incorrect value.

18. The method of claim 17, wherein the identifying string value is based upon an identification of the white-box implementation of a cryptographic function.

19. The method of claim 17, wherein the identifying string value is based upon a hash of a portion of code in the white-box implementation of a cryptographic function.

20. The method of claim 17, wherein the identifying string value is based upon an identification of a cryptographic system implementing the white-box implementation of the cryptographic function.

21. The method of claim 17, wherein the identifying string value is based upon a user password.

22. The method of claim 17, wherein the white-box implementation of the cryptographic function includes a network of finite state machines.

23. The method of claim 17, wherein the white-box implementation of the cryptographic function includes a network of lookup tables.

24. The method of claim 17, wherein the cryptographic function is one of advanced encryption system (AES) or data encryption standard (DES).

25. A method of mapping an input message into an output message using a white-box implementation of a cryptographic function having a plurality of layers with a state matrix configured to indicate the state of the cryptographic operation between layers, comprising:
 receiving a first portion of the state matrix by a first substitution box in a first layer and producing a first output $v_1$;
 receiving a second portion of the state matrix by a second substitution box in a first layer and producing a second output $v_2$;
 calculating $v_1 \oplus h(\sigma, v_1)$ by a first lookup table configured to receive the first output $v_1$ and an identifying string value $\sigma$ to, wherein h is an arbitrary function;
 receiving the first output $v_1$ by a second lookup table configured to calculate $h(s, v_1)$ where s is a set of binding string values;
 calculating $v_1 \oplus h(\sigma, v_1) \oplus v_2$ by a first XOR; and
 combining $v_1 \oplus h(\sigma, v_1) \oplus v_2$ with $h(s, v_1)$ by a second XOR,
 wherein the output of the second XOR is based on $v_1 \oplus v_2$ when the identifying string value $\sigma$ is equal to one of a set of binding string values s resulting in the output message having a correct value, and
 wherein the output of the second XOR is not based on $v_1 \oplus v_2$ when the identifying string value $\sigma$ is not equal to one of a set of binding string values s resulting in the output message having an incorrect value.

26. The method of claim 25, wherein the identifying string value is based upon an identification of the white-box implementation of a cryptographic function.

27. The method of claim 25, wherein the identifying string value is based upon a hash of a portion of code in the white-box implementation of a cryptographic function.

28. The method of claim 25, wherein the identifying string value is based upon an identification of a cryptographic system implementing the white-box implementation of the cryptographic function.

29. The method of claim 25, wherein the identifying string value is based upon a user password.

30. The method of claim 25, wherein the white-box implementation of the cryptographic function includes a network of finite state machines.

31. The method of claim 25, wherein the white-box implementation of the cryptographic function includes a network of lookup tables.

32. The method of claim 25, wherein the cryptographic function is one of advanced encryption system (AES) or data encryption standard (DES).

* * * * *